United States Patent
Kawachi et al.

(10) Patent No.: US 9,760,221 B2
(45) Date of Patent: Sep. 12, 2017

(54) EMBEDDED TOUCH SCREEN

(71) Applicant: Panasonic Liquid Crystal Display Co., Ltd., Himeji-shi, Hyogo (JP)

(72) Inventors: Genshiro Kawachi, Osaka (JP); Kazuo Kita, Osaka (JP); Kikuo Ono, Chiba (JP)

(73) Assignee: Panasonic Liquid Crystal Display Co., Ltd., Hyogo (JP)

( * ) Notice: Subject to any disclaimer, the term of this patent is extended or adjusted under 35 U.S.C. 154(b) by 37 days.

(21) Appl. No.: 14/547,592

(22) Filed: Nov. 19, 2014

(65) Prior Publication Data

US 2015/0077393 A1 Mar. 19, 2015

Related U.S. Application Data

(63) Continuation of application No. PCT/JP2013/003142, filed on May 17, 2013.

(30) Foreign Application Priority Data

May 28, 2012 (JP) .................................. 2012-121407

(51) Int. Cl.
*G06F 3/044* (2006.01)
*G02F 1/1333* (2006.01)
(Continued)

(52) U.S. Cl.
CPC ............ *G06F 3/044* (2013.01); *G02F 1/1333* (2013.01); *G02F 1/13338* (2013.01); *G02F 1/134363* (2013.01); *G06F 3/0412* (2013.01)

(58) Field of Classification Search
None
See application file for complete search history.

(56) References Cited

U.S. PATENT DOCUMENTS

| 5,940,064 A | 8/1999 | Kai et al. |
| 2004/0004606 A1 | 1/2004 | Kodate et al. |

(Continued)

FOREIGN PATENT DOCUMENTS

| JP | 2008-027292 | 2/2008 |
| JP | 2011-227923 | 11/2011 |
| JP | 2011-527787 | 11/2011 |

OTHER PUBLICATIONS

Office Action issued in U.S. Appl. No. 13/770,618, Aug. 13, 2015, 29 pages.

(Continued)

*Primary Examiner* — Claire X Pappas
*Assistant Examiner* — Christopher Kohlman
(74) *Attorney, Agent, or Firm* — Hamre, Schumann, Mueller & Larson, P.C.

(57) ABSTRACT

An embedded touch screen, including: a first substrate including, on a front surface thereof, a plurality of detecting electrodes extending in a second direction; a second substrate having an image region in which a plurality of pixels are arranged in matrix, the second substrate including: a pixel electrode connected to corresponding one of the plurality of video signal lines via a switching element connected to corresponding one of the plurality of scanning signal lines in each of the plurality of pixels; and a common electrode; a liquid crystal layer sandwiched between the first substrate and the second substrate; an application circuit for applying an alternating signal to the pixel electrode; a detection circuit for detecting a signal excited on the corresponding one of the plurality of detecting electrodes; and a scanning circuit for scanning the pixel electrode in the second direction during detection by the detection circuit.

9 Claims, 12 Drawing Sheets

(51) Int. Cl.
    *G02F 1/1343*     (2006.01)
    *G06F 3/041*     (2006.01)

(56) References Cited

U.S. PATENT DOCUMENTS

| | | |
|---|---|---|
| 2006/0208984 A1 | 9/2006 | Kim et al. |
| 2008/0018612 A1 | 1/2008 | Nakamura et al. |
| 2010/0001973 A1 | 1/2010 | Hotelling et al. |
| 2010/0066692 A1 | 3/2010 | Noguchi et al. |
| 2010/0085281 A1 | 4/2010 | Yokota |
| 2010/0097344 A1 | 4/2010 | Verweg |
| 2010/0110038 A1 | 5/2010 | Mo et al. |
| 2010/0309162 A1* | 12/2010 | Nakanishi ............... G06F 3/044 345/174 |
| 2011/0216039 A1 | 9/2011 | Chen et al. |
| 2011/0267296 A1* | 11/2011 | Noguchi ............... G06F 3/0412 345/173 |
| 2012/0044190 A1* | 2/2012 | Yilmaz ................. G06F 3/0412 345/174 |
| 2012/0057312 A1 | 3/2012 | Yoo et al. |
| 2012/0071206 A1* | 3/2012 | Pemberton-Pigott . G06F 3/0414 455/566 |
| 2013/0155059 A1* | 6/2013 | Wang ..................... G06F 3/041 345/419 |
| 2013/0293513 A1 | 11/2013 | Hotelling et al. |
| 2014/0139484 A1 | 5/2014 | Hotelling et al. |
| 2014/0247247 A1 | 9/2014 | Hotelling et al. |

OTHER PUBLICATIONS

Kanda, et al., "55.2: Integrated Active Matrix Capacitive Sensors for Touch Panel LTPS-TFT LCDs", SID Symposium Digest of Technical Papers, vol. 39, No. 1, pp. 834-837, May 2008.

\* cited by examiner

EMBEDDED TOUCH SCREEN

CROSS-REFERENCE TO RELATED APPLICATION

This application is Bypass Continuation of international patent application PCT/JP2013/003142, filed: May 17, 2013 designating the United States of America, the entire disclosure of which is incorporated herein by reference. Priority is claimed based on Japanese patent application JP2012-121407, filed: May 28, 2012. The entire disclosure of Japanese patent application JP2012-121407 is incorporated herein by reference in its entirety.

TECHNICAL FIELD

This application relates to an embedded touch screen.

BACKGROUND

A tablet-type information terminal and a multifunctional mobile phone (so-called smartphone) including a touch screen have become popular. The "touch screen" as used herein refers to a device obtained by combining a touch panel to an image display device such as a liquid crystal display device. Further, the "touch panel" as used herein refers to a planar contact-detection type pointing device. A user directly touches the touch screen with a finger, a stylus, or the like while looking at an image displayed on the screen, thereby performing input.

The generally popularized touch screen is obtained by integrally bonding the image display device and the contact-detection type input device, which are separately formed. Such a touch panel has disadvantages in panel thickness and weight, the number of components, and its cost. Further, the number of manufacturing steps increases, and hence there arises a problem of decreasing yields.

In view of this, there has been proposed a touch screen in which the image display device and the contact-detection type input device are not separately formed but integrally formed. Such a touch screen is referred to as, for example, "embedded type" or "in-cell type". In this specification, such a touch screen is hereinafter referred to as "embedded touch screen". Of those, in particular, there has been proposed a system focusing on the fact that the user's finger forms an electrical capacitor. The system detects contact by detecting the change of a capacitance when the finger (or a conductive stylus) touches the surface of the touch screen.

Japanese Patent Application Laid-open No. 2011-227923 discloses an embedded touch screen in which a capacitive element is formed between a common electrode formed on a rear surface of an opposing substrate or a front surface of a pixel substrate and a touch detection electrode formed on a front surface of the opposing substrate. The contact is detected by applying an alternating rectangular wave to the common electrode, and detecting a potential waveform appearing on the touch detection electrode.

In the embedded touch screen disclosed in Japanese Patent Application Laid-open No. 2011-227923, the common electrode is used as an electrode for forming the capacitive element for contact detection. Therefore, the shape of the common electrode is limited. Further, the alternating rectangular wave as a signal for contact detection is used in common with a common drive signal, and hence an applied waveform is not always suitable for contact detection.

This application has been made in view of the above-mentioned circumstances, and has an object to provide an embedded touch screen that is unlimited by the shape of the common electrode and the signal for contact detection.

SUMMARY

This application has various aspects, and the summary of representative aspects is as follows.

(1) An embedded touch screen according to one embodiment of this application includes: a plurality of scanning signal lines extending in a first direction; a plurality of video signal lines extending in a second direction; a first substrate including, on one of a front surface and a rear surface thereof, a plurality of detecting electrodes extending in the second direction; a second substrate having an image region in which a plurality of pixels are arranged, the plurality of pixels being sectioned by the plurality of scanning signal lines and the plurality of video signal lines in matrix, the second substrate including, on a front surface thereof: a pixel electrode connected to corresponding one of the plurality of video signal lines via a switching element connected to corresponding one of the plurality of scanning signal lines in each of the plurality of pixels; and a common electrode; a liquid crystal layer sandwiched between the first substrate and the second substrate; an application circuit for applying an alternating signal to one of the pixel electrode and corresponding one of the plurality of detecting electrodes; a detection circuit for detecting a signal excited on another of the pixel electrode and the corresponding one of the plurality of detecting electrodes; and a scanning circuit for scanning the pixel electrode at least in the second direction during detection by the detection circuit.

(2) In the embedded touch screen according to Item (1), the scanning circuit outputs a scanning signal to corresponding one of the plurality of scanning signal lines.

(3) In the embedded touch screen according to Item (1), the plurality of detecting electrodes are formed on the rear surface of the first substrate.

(4) In the embedded touch screen according to Item (3), the front surface of the first substrate is a polished surface.

(5) In the embedded touch screen according to Item (1), the plurality of detecting electrodes are formed on the rear surface of the first substrate.

DETAILED DESCRIPTION

First, the basic principle of an embedded touch screen according to each embodiment of this application is described with reference to FIGS. 1 and 2.

Figure 1:
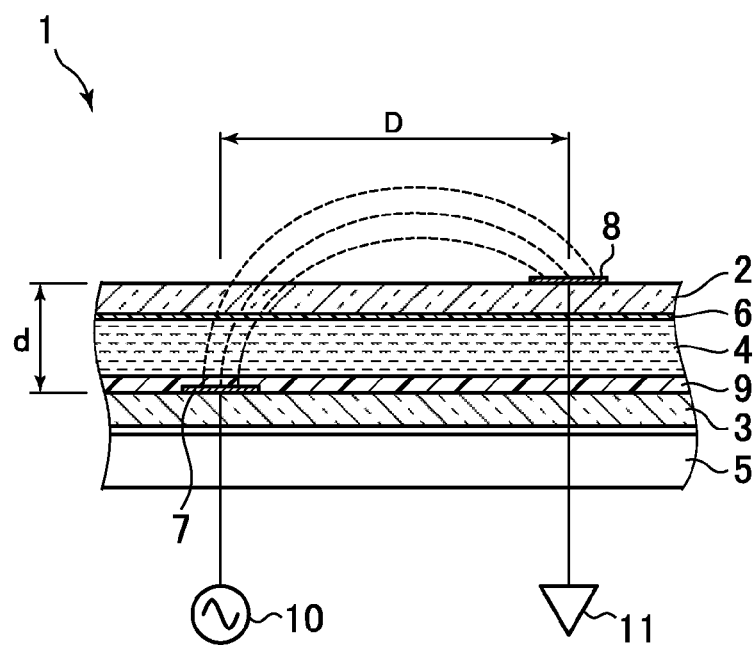
FIG. 1 is a schematic sectional view illustrating the principle of an embedded touch screen according to this application.
Figure 2:
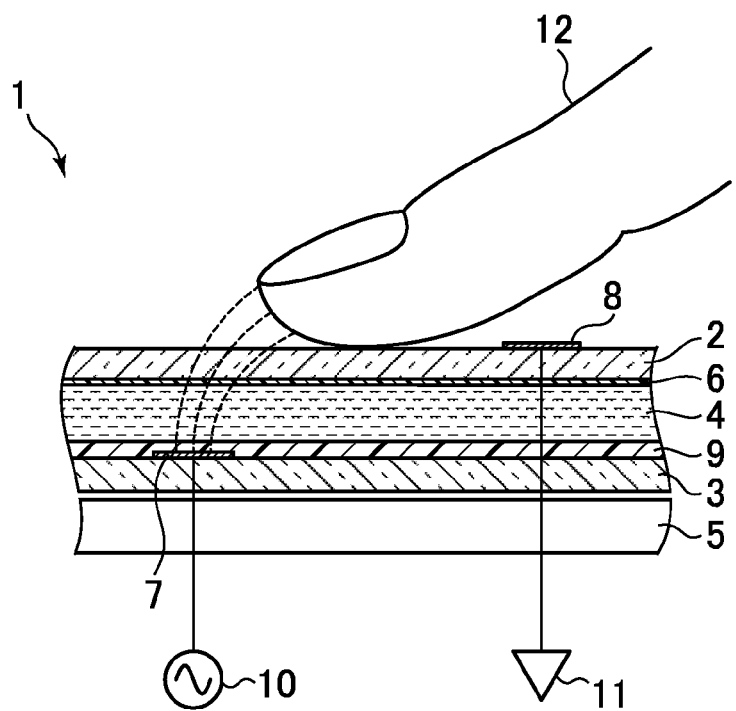
FIG. 2 is a schematic sectional view illustrating the principle of the embedded touch screen according to this application.

FIG. 1 is a schematic sectional view illustrating the principle of an embedded touch screen 1 according to this application. In FIG. 1, an image displayed on the embedded touch screen 1 is observed by an observer from the upper side in FIG. 1. The embedded touch screen 1 has a configuration of a general liquid crystal display device, and includes a liquid crystal panel arranged on the observer's side and a backlight unit 5 as a planar light source arranged on the rear surface side of the liquid crystal panel. The liquid crystal panel has a structure in which a liquid crystal layer 4 is sandwiched between a first substrate 2 and a second substrate 3, which are transparent substrates made of glass or the like. In the following, a surface of the embedded touch screen 1, which faces the observer's side, is referred to as a "front surface", and a surface on the opposite side is referred to as a "rear surface". Further, the observer's side is referred to as "front surface side", and the opposite side is referred to as "rear surface side".

An insulating layer 6 is formed on the rear surface of the first substrate 2. The insulating layer 6 includes a color filter layer, an alignment film, and the like, although illustration of detailed configurations thereof is omitted in FIG. 1. Therefore, the first substrate 2 is generally called a color filter substrate. Further, an electrode 8 is formed on the front surface or the rear surface of the first substrate 2. In FIG. 1, the electrode 8 is formed on the front surface. Note that, when the electrode 8 is formed on the rear surface, the electrode 8 may be arranged on the first substrate 2 side so as to be covered with the insulating layer 6. The electrode 8 is an electrode formed for contact detection, and is desired to be a transparent conductive film made of indium tin oxide (ITO), indium zinc oxide (InZnO), or the like. In a case where the embedded touch screen 1 is an active matrix liquid crystal display device, on the front surface of the second substrate 3, there are formed electrical structures such as TFTs as switching elements, various wirings, and various electrodes for controlling the alignment direction of a liquid crystal material in the liquid crystal layer 4. In this case, those electrical structures are schematically illustrated simply by an electrode denoted by reference numeral 7. The electrode 7 and other electrical structures are covered with an insulating layer 9. The insulating layer 9 includes a general insulating film, a general alignment film, and the like, although illustration of detailed configurations thereof is omitted in FIG. 1.

In this case, the electrode 7 is connected to an alternating power source 10, and an alternating signal is applied to the electrode 7 by the alternating power source 10. Note that, the "alternating signal" as used herein refers to a current or a voltage that periodically changes its magnitude and direction, and may have any waveform. In this specification, a sine wave AC voltage is hereinafter used as the representative alternating signal, but this application is not limited thereto. On the other hand, the electrode 8 is arranged adjacent to the electrode 7. The electrode 8 is connected to an amplifier 11 for amplifying a signal, that is, a voltage or a current excited on the electrode 8, and detects the amplification result. In this case, as an example, the amplifier 11 amplifies the voltage excited on the electrode 8. Note that, in the following, the electrode to which an alternating signal is applied is referred to as "application electrode", and the electrode in which the excited signal is detected is referred to as "detection electrode". In the example of FIG. 1, the electrode 7 is the application electrode, and the electrode 8 is the detection electrode.

In this case, an electric field excited by the alternating signal applied to the electrode 7 is an alternating electric field. The line of electric force of the alternating electric field is indicated by broken lines in FIG. 1, and is illustrated from the electrode 7 to protrude from the first substrate 2 on the front surface side and connect to the electrode 8. At this time, a signal excited by this alternating electric field is generated in the electrode 8. In this case, when a user of the embedded touch screen 1 touches the front surface of the first substrate 2 with a finger 12, a stylus, or other conductive members, as illustrated in FIG. 2, the alternating electric field between the electrode 7 and the electrode 8 is blocked, and the level of the signal excited on the electrode 8 is reduced. Through detection of a change in level of this signal amplified by the amplifier 11, it is detected that the user has touched the front surface of the embedded touch screen 1. Further, based on the position of the electrode 8 at which the signal level has changed, the position where the user has touched is detected, that is, coordinate detection is performed.

By the way, when contact detection and coordinate detection are performed by the principle described above, as illustrated in FIG. 1, the alternating electric field to be excited by the electrode 7 is required to protrude from the first substrate 2 on the front surface side. As a first condition therefor, an electrode that prevents the alternating electric field from protruding on the front surface side cannot be formed on the first substrate 2. That is, an electrode that becomes a so-called Faraday cage, which blocks the electric field, cannot be formed on the first substrate 2. Generally, the liquid crystal display device controls the alignment direction of the liquid crystal by an electric field formed between a pixel electrode and a common electrode. Depending on the liquid crystal driving system, the common electrode may be formed on the first substrate or on the second substrate. The common electrode formed on the first substrate becomes a Faraday cage, and hence this application is required to adopt a form in which the common electrode is formed on the second substrate 3. That is, the pixel electrode and the common electrode are formed on the front surface of the second substrate 3. As a representative system of driving the liquid crystal in such a form, there is known an in-plane switching (IPS) system. In this specification, the embedded touch screen 1 is an IPS-system liquid crystal display device.

As a second condition, a pitch between the electrode 7 and the electrode 8 requires to be sufficiently large. When the pitch therebetween is small, the alternating electric field remains inside the embedded touch screen 1 and hardly protrudes from the first substrate 2 on the front surface side. Specifically, it is required that a pitch D between the electrode 7 and the electrode 8 be at least larger than a distance d from the front surface of the first substrate 2 to the front surface of the second substrate 3. Note that, in the description above, an alternating signal is applied to the electrode 7, and a signal excited on the electrode 8 is detected. However, a reverse configuration is acceptable.

In this case, the electrode 8 is not essential to the liquid crystal display device in a form in which the pixel electrode and the common electrode are formed on the front surface of the second substrate 3. The electrode 8 is an electrode added to impart the function as the touch screen. On the other hand, it is not always necessary to form a dedicated electrode as the electrode 7. Some electrodes necessary for the embedded touch screen 1 to function as the liquid crystal display device may be used to serve as the electrode 7. In this manner, the embedded touch screen 1 can be obtained without significantly changing the circuit configuration of the existing liquid crystal display device. As such an electrode, a pixel electrode is herein used. This is described later in detail.

Note that, as illustrated in FIG. 1, the alternating electric field excited by the electrode 7 passes through the liquid crystal layer 4, and hence the alternating electric field may affect the alignment direction of the liquid crystal. Therefore, the alternating signal applied to the electrode 7 by the alternating power source 10 is set to have a frequency that is equal to or larger than a frequency at an extent that does not cause response of the liquid crystal in the liquid crystal layer 4. In this manner, the influence on the liquid crystal due to the alternating electric field is substantially eliminated. The frequency at which the liquid crystal may respond cannot be categorically determined because the frequency varies depending on the composition of the liquid crystal, the thickness of the liquid crystal layer 4, and external factors such as temperature, but it is generally considered that no response is made when the frequency of the electric field to be applied is equal to or larger than about 1 kHz. Therefore, the frequency of the alternating signal in this application is equal to or larger than 1 kHz, preferably equal to or larger than 10 kHz. On the other hand, ideally, there is no upper limit in the frequency of the alternating signal, but actually, the upper limit is determined by various factors, for example, the detection limit of the amplifier 11 and the cutoff frequency of the TFT. Therefore, considering the technology of manufacturing the embedded touch screen 1, that is, the liquid crystal display device at present time, the upper limit of the alternating signal is about 10 MHz to 20 MHz.

In the following, based on the above-mentioned principle, examples of the specific configuration of the embedded touch screen 1 are described by means of embodiments.

Figure 3:
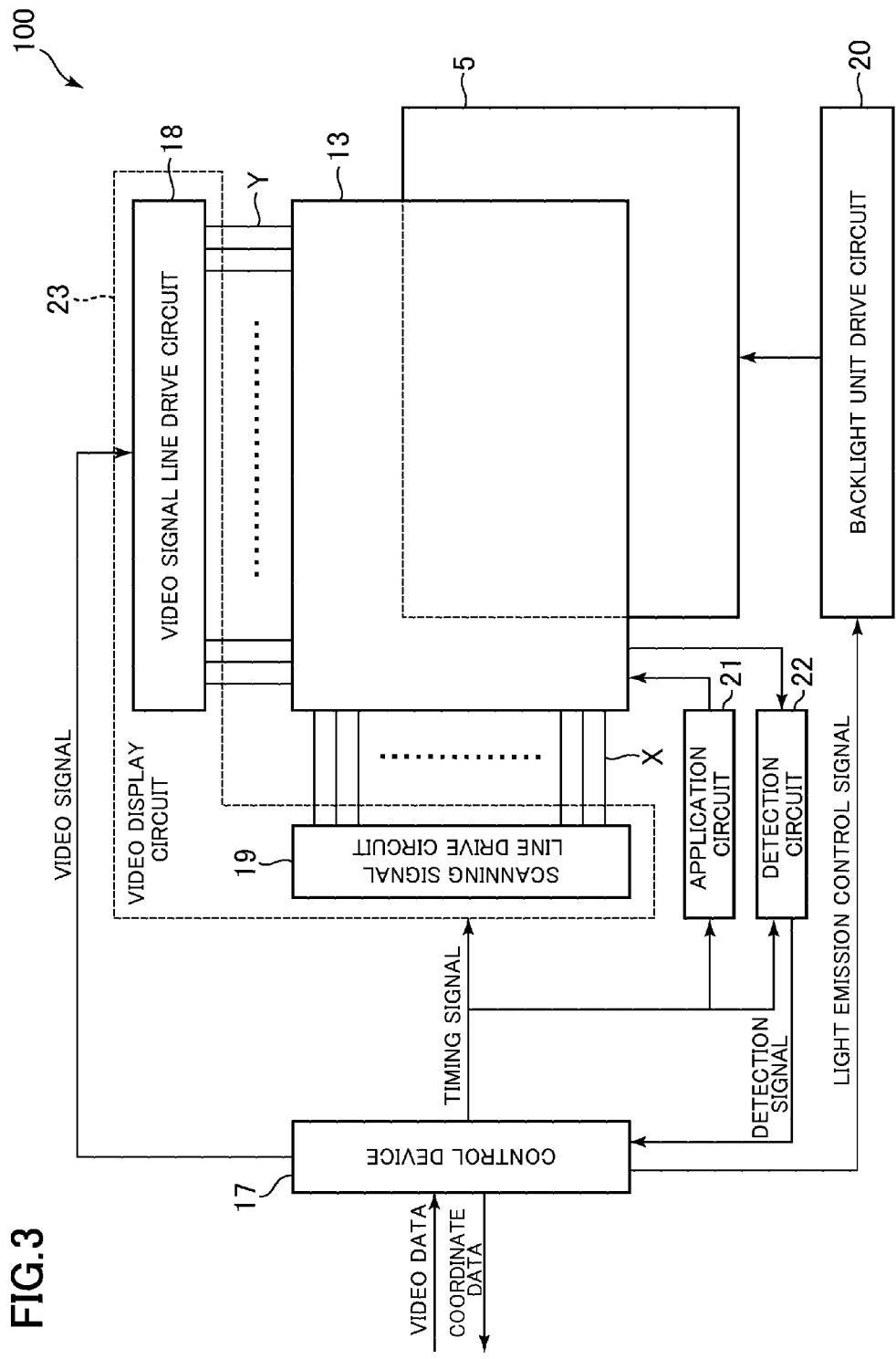
FIG. 3 is a view illustrating a configuration of an embedded touch screen according to a first embodiment of this application.

FIG. 3 is a view illustrating a configuration of an embedded touch screen 100 according to a first embodiment of this application.

A liquid crystal panel 13 has a rectangular shape, and has lateral and vertical lengths determined depending on the application of the embedded touch screen 100. The liquid crystal panel 13 illustrated in FIG. 3 has a laterally long shape (the lateral length is larger than the vertical length). However, the shape of the liquid crystal panel 13 is not limited thereto, and the liquid crystal panel 13 may have a vertically long shape (the lateral length is smaller than the vertical length), or the lateral length may be the same as the vertical length.

On the second substrate 3 of the liquid crystal panel 13, a plurality of video signal lines Y and a plurality of scanning signal lines X are formed. The video signal line Y and the scanning signal line X are formed orthogonal to each other, and are formed into a lattice shape. A region surrounded by two adjacent video signal lines Y and two adjacent scanning signal lines X corresponds to one pixel.

Figure 4:
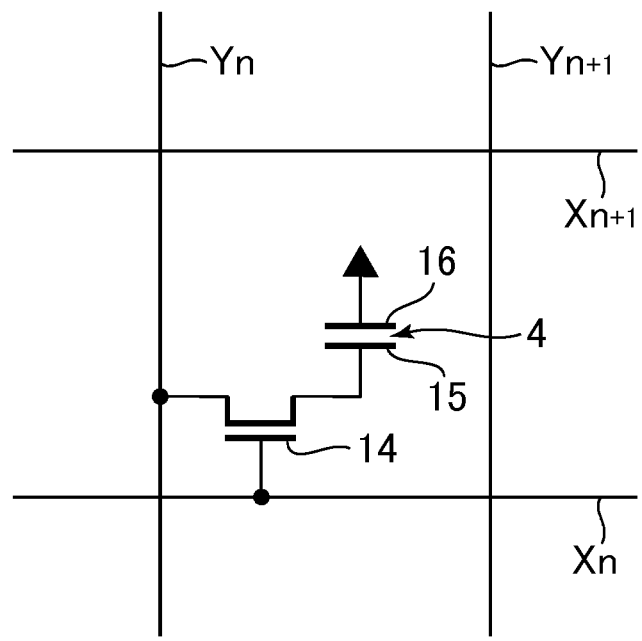
FIG. 4 illustrates one of pixels formed in a liquid crystal panel by a circuit diagram.

FIG. 4 illustrates one of the pixels formed in the liquid crystal panel 13 by a circuit diagram. A region surrounded by video signal lines Yn and Yn+1 and scanning signal lines Xn and Xn+1 as illustrated in FIG. 4 corresponds to one pixel. In this case, it is supposed that the pixel focused here is driven by the video signal line Yn and the scanning signal line Xn. On the second substrate 3 side of each pixel, a TFT 14 is formed. The TFT 14 is turned on by a scanning signal input from the scanning signal line Xn. The video signal line Yn supplies a voltage (signal indicating a gradation value of each pixel) to a pixel electrode 15 of the pixel via the TFT 14 in the on state.

Further, similarly on the second substrate 3 side, a common electrode 16 is formed so as to form a capacitor via the liquid crystal layer 4 sealed and sandwiched between the first substrate 2 and the second substrate 3. The common electrode 16 is electrically connected to a common potential. Therefore, the electric field generated between the pixel electrode 15 and the common electrode 16 is changed in accordance with a voltage applied to the pixel electrode 15, to thereby change the alignment state of the liquid crystal in the liquid crystal layer 4. Thus, a polarized state of a light beam passing through the liquid crystal panel 13 is controlled. Further, a polarization filter is adhered to each of the front surface and the rear surface of the liquid crystal panel 13. With this, each of the pixels formed in the liquid crystal panel 13 functions as an element for controlling the light transmittance. Further, the transmittance of light of each pixel is controlled in accordance with input image data, to thereby form an image. Therefore, in the liquid crystal panel 13, a region in which the pixels are formed corresponds to an image region in which an image is to be formed.

Referring back to FIG. 3, an external device inputs video data to a control device 17. The control device 17 may be a micro computer including a central processing unit (CPU), and a non-volatile/volatile storage element such as a read only memory (ROM) and a random access memory (RAM). The control device 17 is configured to perform various types of image processing such as color adjustment with respect to the input video data, generate a video signal indicating a gradation value of each pixel, control contact detection and coordinate detection to be performed by the embedded touch screen 100 as described later, and output coordinate data obtain as a result to an external device.

The control device 17 outputs the generated video signal to a video signal line drive circuit 18. Further, the control device 17 generates, based on the input video data, a timing signal for synchronizing the video signal line drive circuit 18, a scanning signal line drive circuit 19, a backlight unit drive circuit 20, an application circuit 21, and a detection circuit 22, and outputs the generated timing signal to the respective circuits. Note that, the physical form of the control device 17 is not particularly limited, and the control device 17 may be formed of a plurality of large scale integrations (LSIs) or a single member. Further, the backlight unit drive circuit 20 and other circuits may not be synchronized to each other.

The backlight unit drive circuit 20 is a circuit for supplying a necessary current to the backlight unit 5. In this embodiment, the control device 17 generates, based on the input video data, a signal for controlling the brightness of the backlight unit 5, and outputs the generated signal to the backlight unit drive circuit 20. Then, the backlight unit drive circuit 20 controls the amount of current to be supplied to the backlight unit 5 in accordance with the generated signal and the timing signal if necessary, and adjust the brightness of the backlight unit 5. Note that, the brightness of the backlight unit 5 may be adjusted for each of regions in the backlight unit 5. As a light source of the backlight unit 5, any known light source may be used. When a light emitting diode is used as the light source, as a method of controlling the brightness, there may be employed a pulse width modulation (PWM) method in which the current amount is set constant and the brightness is controlled by a light emission period. Alternatively, no control may be made on the brightness of the light emitting diode, and the current amount may be set constant so that light is emitted at a constant light intensity.

The scanning signal line drive circuit 19 is connected to the scanning signal lines X. The scanning signal line drive circuit 19 selects the scanning signal lines X in order in accordance with the timing signal input from the control device 17, and applies a voltage to the selected scanning signal line X. When the voltage is applied to the scanning signal line X, the TFT 14 connected to the scanning signal line X is turned on.

The video signal line drive circuit 18 is connected to the video signal lines Y. The video signal line drive circuit 18 applies a voltage corresponding to the video signal indicating the gradation value of each pixel to each of the TFTs 14 connected to the selected scanning signal line X in conformity to the selection of the scanning signal line X by the scanning signal line drive circuit 19.

Note that, in this embodiment, the control device 17 and the backlight unit drive circuit 20 illustrated in FIG. 3 are formed on a control board (not shown). Further, a video display circuit 23 including the video signal line drive circuit 18 and the scanning signal line drive circuit 19, the application circuit 21, and the detection circuit 22 are formed on a flexible printed circuit (FPC) board electrically connected to the liquid crystal panel 13, or on a substrate forming the liquid crystal panel 13 (so-called system on glass (SOG)). Note that, those arrangements are merely examples, and positions where the respective circuits are formed are arbitrary. The application circuit 21 and the detection circuit 22 are described later. The application circuit 21 and the detection circuit 22 are circuits including the alternating power source 10 and the amplifier 11, respectively (see FIGS. 1 and 2).

Figure 5:
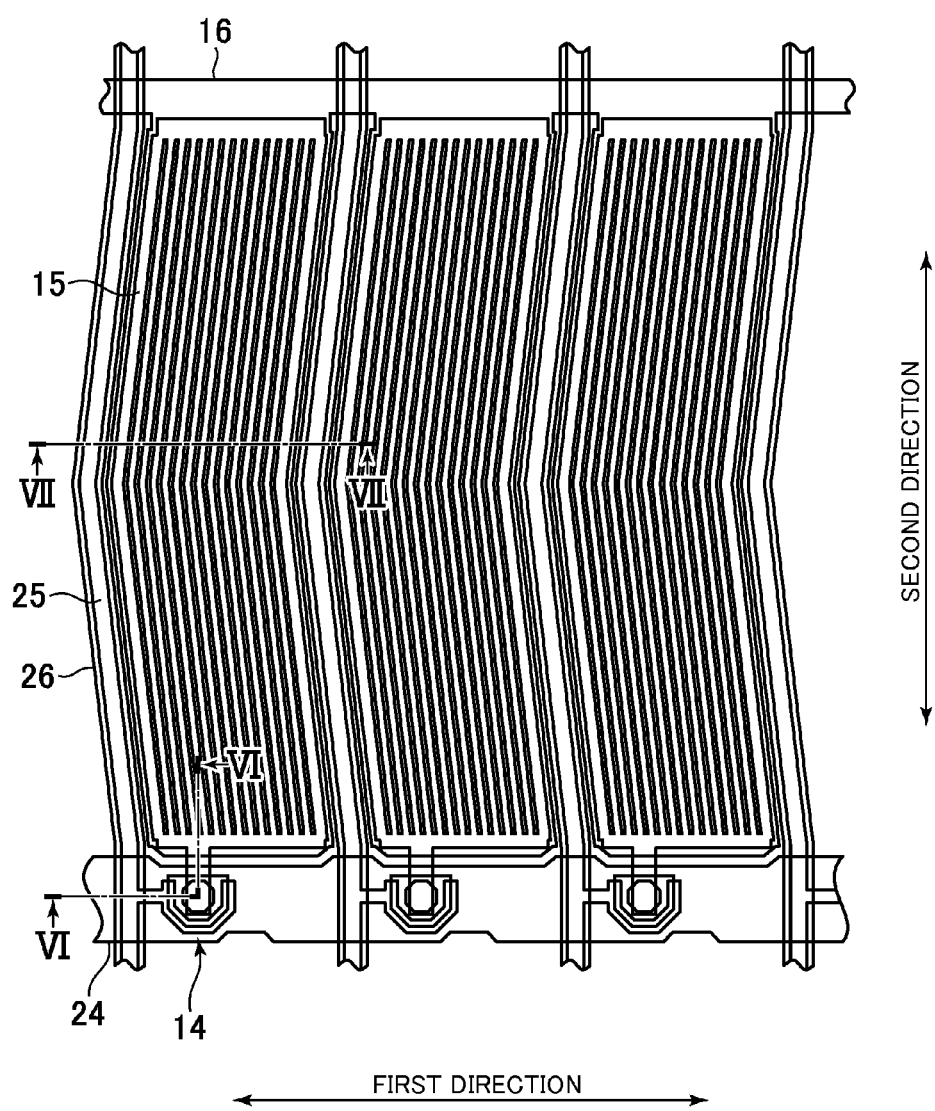
FIG. 5 is a partially enlarged plan view of an image region of the embedded touch screen.

FIG. 5 is a partially enlarged plan view of the image region of the embedded touch screen 100. FIG. 5 illustrates a part including three adjacent pixels, and illustrates a scanning signal line 24, a video signal line 25, the pixel electrode 15, the common electrode 16, the TFT 14 formed for each of the pixels, and a video signal shielding electrode 26. Note that, the respective members are stacked on the surface of the second substrate 3 by a known semiconductor manufacturing process, and are arranged so as to overlap with each other through intermediation of insulating layers as appropriate. However, in order to clarify the positional relationship, FIG. 5 illustrates outer shapes of the respective members even at overlapping parts.

The scanning signal line 24 is a strip line continuously extending in the lateral direction of FIG. 5, and in this embodiment, is a laminated film of ITO and copper. Further, the video signal line 25 is a strip line formed of a copper thin film, which continuously extends in the vertical direction of FIG. 5 so as to be orthogonal to the scanning signal line 24. In this specification, the direction in which the scanning signal line 24 extends is hereinafter referred to as "first direction", and the direction in which the video signal line 25 extends is hereinafter referred to as "second direction". Further, a substantially rectangular region surrounded by the adjacent scanning signal lines 24 and the adjacent video signal lines 25 corresponds to one pixel. Note that, in this embodiment, in order to improve display characteristics, the pixel has not a complete rectangular shape but a bent shape, and the video signal line 25 is not a straight line extending along the second direction but a slightly bent line.

Inside the pixel, the pixel electrode 15 and the common electrode 16 formed at a position overlapping with the pixel electrode 15 are arranged. The pixel electrode 15 is an electrode formed of an ITO thin film having a comb-shaped pattern, and is connected to a source electrode of the TFT 14. The common electrode 16 is formed of an ITO thin film having a solid pattern that covers the entire pixel. The common electrodes 16 adjacent to each other in the first direction are connected to each other. Further, the video signal shielding electrode 26 is a strip line which is formed right above the video signal line 25 in parallel thereto in an overlapping manner, and is formed of an ITO thin film extending in the second direction. The video signal shielding electrode 26 is connected to a common potential, and has a function of electrically shielding the video signal line 25 so that a noise electric field from the video signal line 25 does not reach the pixel electrode 15. With this, during image display, image deterioration due to crosstalks of video signals is prevented. Further, during contact detection, influences on contact detection due to crosstalks of alternating signals to be applied to the video signal line 25 as described later is prevented. Note that, the video signal shielding electrode 26 is not a necessary configuration, and may be omitted if unnecessary.

Figure 6:
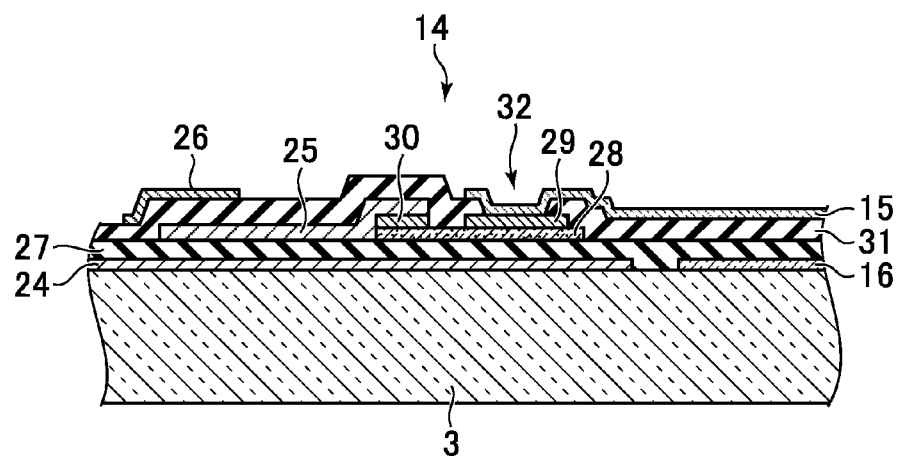
FIG. 6 is a sectional view taken along the line VI-VI of FIG. 5.

FIG. 6 is a sectional view taken along the line VI-VI of FIG. 5. FIG. 6 illustrates a cross-section of the TFT 14. A gate insulating film 27 made of SiN is formed so as to cover the scanning signal line 24 and the common electrode 16 formed on the second substrate 3. On the gate insulating film 27, a semiconductor layer 28 made of hydrogenated amorphous silicon (a-Si:H) is formed. On the semiconductor layer 28, a source electrode 29 and a drain electrode 30 are formed so as to be separated from each other in plan view. Each of the source electrode 29 and the drain electrode 30 is formed by laminating, on an n+ type hydrogenated amorphous silicon film doped with phosphorus, a metal film such as a laminated member of copper and molybdenum as necessary. With the scanning signal line 24 that functions as the gate electrode, the gate insulating film 27, the semiconductor layer 28, the source electrode 29, and the drain electrode 30, the TFT 14 is formed.

The video signal line 25 is connected to the drain electrode 30. Further, a protective insulating film 31 made of SiN is formed so as to cover an overall region including the TFT 14 and the video signal line 25. On the protective insulating film 31, the pixel electrode 15 is formed. The pixel electrode 15 and the source electrode 29 are connected to each other via a through hole 32. Further, at a position overlapping with the video signal line 25 across the protective insulating film 31, the video signal shielding electrode 26 is formed. Note that, FIG. 6 and FIG. 7 subsequent thereto omit the illustration of various insulating films such as a planarizing film and an alignment film, which are formed further on the front side of the pixel electrode 15.

Figure 7:
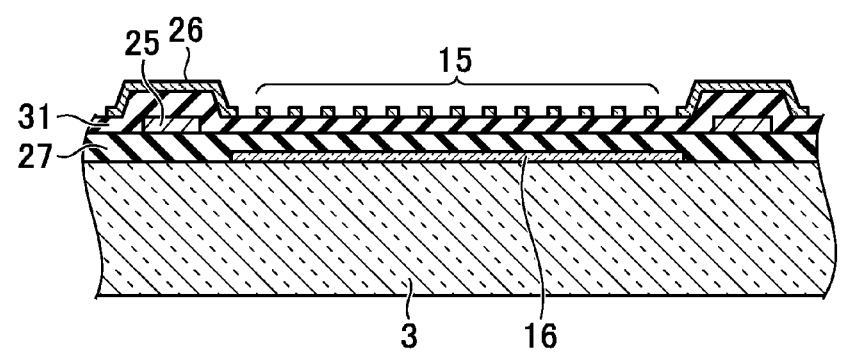
FIG. 7 is a sectional view taken along the line VII-VII of FIG. 5.

FIG. 7 is a sectional view taken along the line VII-VII of FIG. 5. FIG. 7 illustrates a cross-section of a light transmissive region of the pixel, and illustrates the pixel electrode 15 having the comb-shaped pattern and the common electrode 16 formed below the pixel electrode 15. When charges are supplied to the pixel electrode 15 to write a predetermined voltage therein, an electric field in a substantially horizontal direction is formed between the pixel electrode 15 and the common electrode 16, thereby controlling the alignment direction of the liquid crystal. This type of liquid crystal driving system corresponds to the IPS system, which has characteristics of fast liquid crystal response and wide viewing angle. Further, FIG. 7 illustrates a state in which the video signal shielding electrode 26 is formed so as to be overlapped with and insulated from the video signal line 25 in the same layer as the pixel electrode 15.

Note that, the above configuration described with reference to FIGS. 5 to 7 is equivalent to that in a general IPS-system liquid crystal display device. The materials, shapes, and arrangements of the respective members may be changed arbitrarily by a person skilled in the art as long as the functions thereof are not affected. For example, in the above-mentioned configuration, the common electrode 16 is arranged in the lowermost layer (at a position closest to the second substrate 3), and the video signal line 25 is arranged above the common electrode 16. However, the common electrode 16 may be arranged above the video signal line 25.

Figure 8:
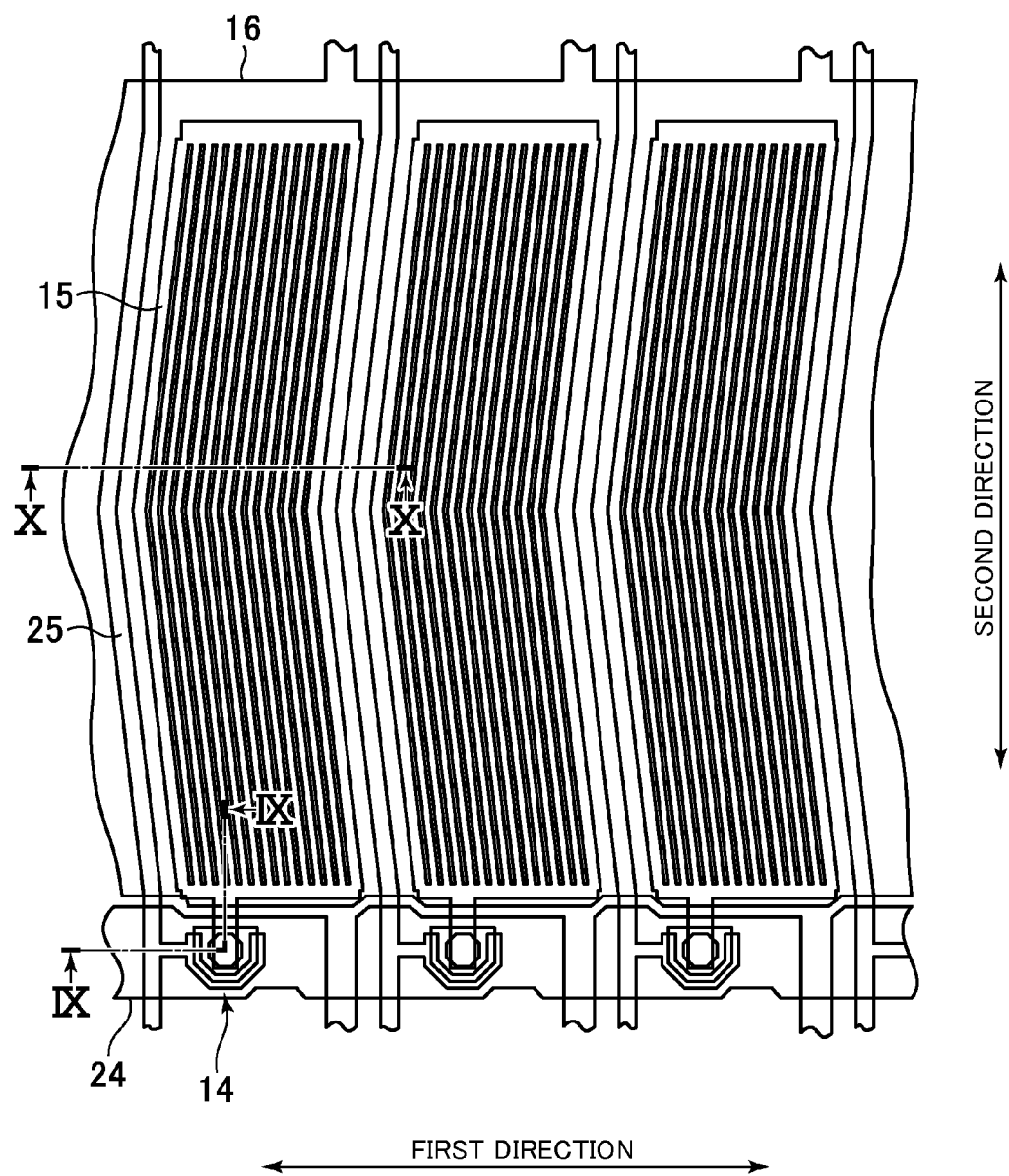
FIG. 8 is a partially enlarged plan view of an image region of an embedded touch screen according to a modified example of the first embodiment of this application.
Figure 9:
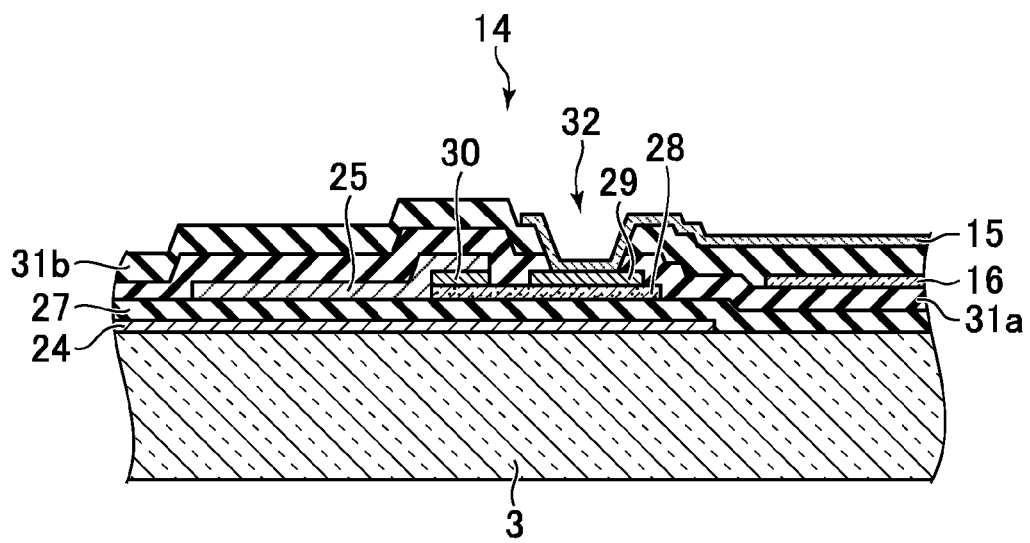
FIG. 9 is a sectional view taken along the line IX-IX of FIG. 8.
Figure 10:
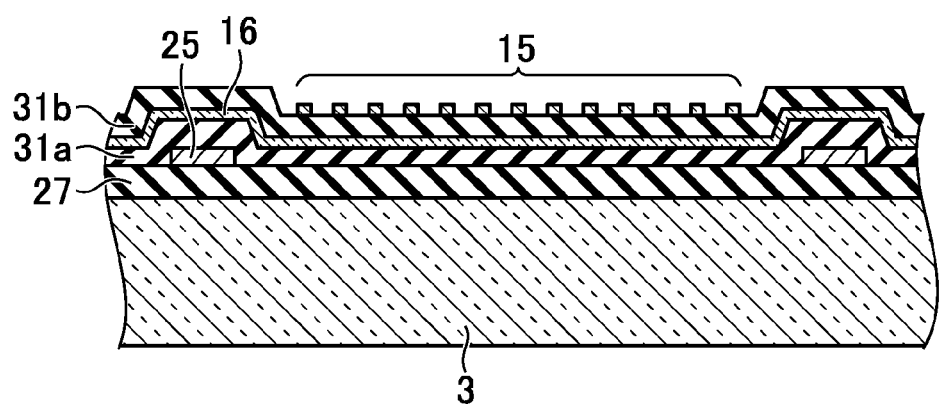
FIG. 10 is a sectional view taken along the line X-X of FIG. 8.

FIGS. 8 to 10 are views illustrating a modified example in which the common electrode 16 is arranged above the video signal line 25. Note that, FIG. 8 corresponds to FIG. 5 described above, FIG. 9 corresponds to FIG. 6 described above, and FIG. 10 corresponds to FIG. 7 described above. FIG. 8 is a partially enlarged plan view of the image region of the embedded touch screen 100 according to the modified example of this embodiment. In this modified example, the common electrode 16 is formed so as to overlap with the video signal line 25 in plan view. Further, the common electrodes 16 of pixels adjacent to each other in the second direction are also connected to each other. Further, the video signal shielding electrode is not formed.

FIG. 9 is a sectional view taken along the line IX-IX of FIG. 8. In this modified example, the common electrode 16 is formed not immediately above the second substrate 3, but on a protective insulating film 31a. Further, another protective insulating film 31b is formed on the protective insulating film 31a and the common electrode 16. The through hole 32 for connecting the pixel electrode 15 and the source electrode 29 to each other is formed so as to pass through the protective insulating film 31a and the protective insulating film 31b.

FIG. 10 is a sectional view taken along the line X-X of FIG. 8. The common electrode 16 formed on the protective insulating film 31a is formed above the video signal line 25 so as to cover the video signal line 25 in plan view. With this, a noise electric field from the video signal line 25 is blocked by the common electrode 16, and does not reach the pixel electrode 15. Therefore, in this modified example, the video signal shielding electrode is unnecessary. The protective insulating film 31b is formed on the common electrode 16, and the comb-shaped pixel electrode 15 is further formed on the upper surface of the protective insulating film 31b.

Note that, in the modified example illustrated in FIGS. 8 to 10, the video signal shielding electrode is not formed. This is because the action and effect thereof can be achieved by the common electrode 16 as an alternative, and the modified example does not exclude the case where the video signal shielding electrode is separately formed.

In the configuration described above, the scanning signal line 24 is shaped so as to extend in the first direction, and the pixel electrodes 15 arranged in the first direction are connected to the video signal lines 25 via the TFTs 14 connected to the same scanning signal line 24. Therefore, the TFTs 14 are collectively turned on or off by the signal from the scanning signal line 24. Further, the pixel electrodes 15 arranged in the second direction are connected to the same video signal line 25 via the TFTs 14.

Figure 11:
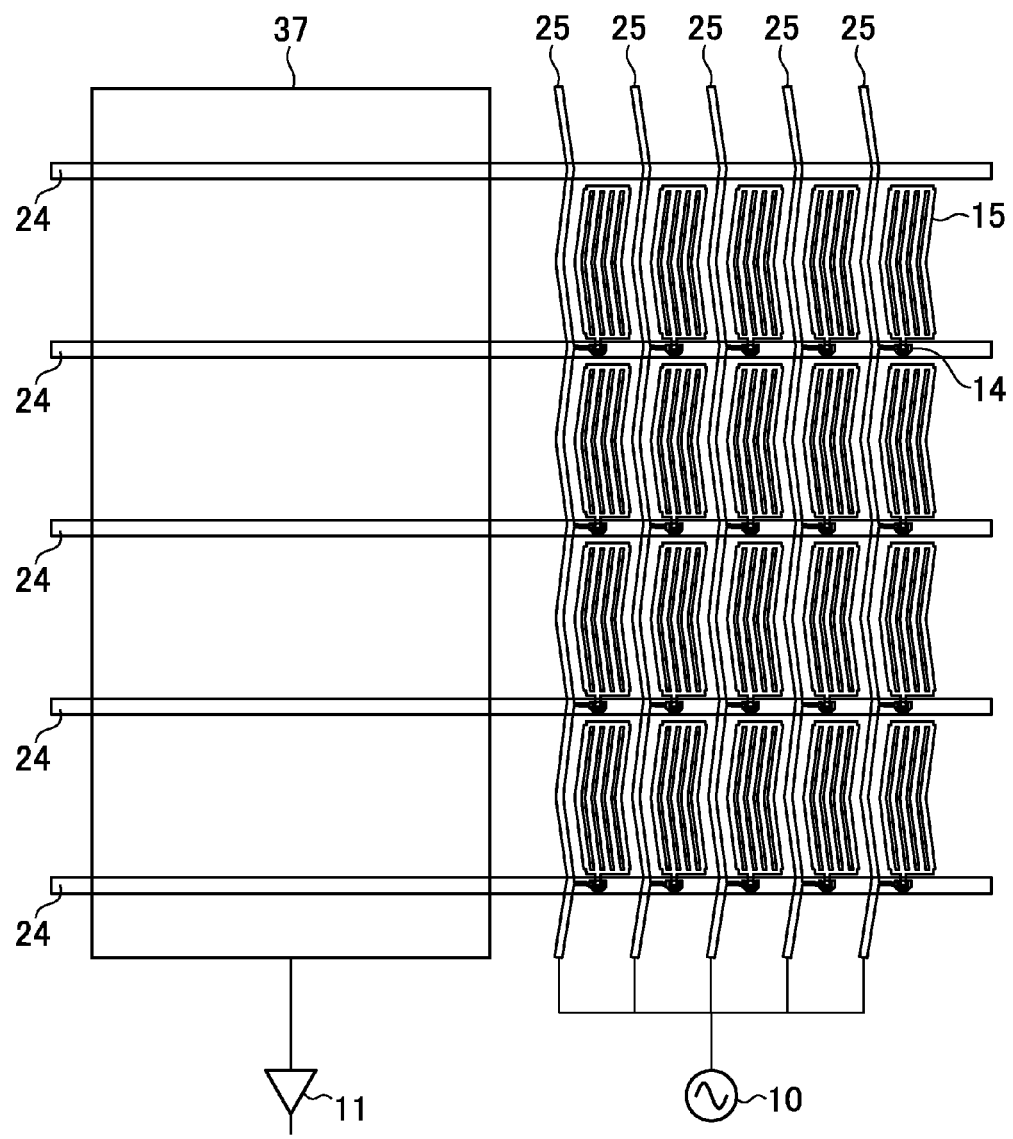
FIG. 11 is a view schematically illustrating a partial configuration when the embedded touch screen according to the first embodiment of this application performs contact detection and coordinate detection.

FIG. 11 is a view schematically illustrating a partial configuration when the embedded touch screen 100 according to this embodiment performs contact detection and coordinate detection. FIG. 11 illustrates only members that contribute to contact detection and coordinate detection among the circuits formed on the first substrate 2 and the second substrate 3, and illustration of other parts is omitted. Further, in order to clarify the positional relationship between the respective members, outer shapes of the members are illustrated even in overlapping parts.

The pixel electrodes 15 arranged in four rows and five columns on the right side in FIG. 11 (only the representative one is denoted by a reference numeral in FIG. 11) integrally function as the application electrode corresponding to the electrode 7 of FIG. 1. That is, the TFTs 14 connected to the respective pixel electrodes 15 illustrated in FIG. 11 are turned on, and further, the video signal lines 25 arranged in five columns are short-circuited to each other to be integrally connected to the alternating power source 10. As a result, the pixel electrodes 15 illustrated in FIG. 11 act as if the pixel electrodes 15 are one application electrode covering four vertical pixels and five lateral pixels.

On the other hand, in this embodiment, a detecting electrode 37 illustrated on the left side in FIG. 11 is an ITO thin film formed on the rear surface of the first substrate 2, and functions as the detection electrode corresponding to the electrode 8 of FIG. 1. The detecting electrode 37 is a band-like strip electrode extending in the second direction, and has a width that covers five lateral pixels similarly to the above-mentioned application electrode. Then, the voltage excited on the detecting electrode 37 is amplified by the amplifier 11 to be read outside.

As described above, in this embodiment, the application electrode and the detecting electrode each cover a plurality of pixels in a width direction orthogonal to the second direction corresponding to an arrangement direction, that is, in the first direction. The reason is as follows. As described above, a large pitch is taken between the application electrode and the detection electrode, and the shape of each electrode is set to be planer. Therefore, the alternating electric field formed between the electrodes protrudes from the front surface of the first substrate 2. At present time, in general, the thickness of the liquid crystal layer 4 is normally 3 μm to 5 μm, and the thickness of the first substrate 2 is about 0.5 mm to 0.7 mm. Therefore, the pitch and size (that is, width) of each of the application electrode and the detection electrode in the adjacent direction thereof are required to be set equivalent to the above. It is not very realistic to newly form an electrode having such a size on particularly the second substrate 3 in view of the function of the embedded touch screen 100 as the liquid crystal display device. Therefore, as in this embodiment, the plurality of pixel electrodes 15 are collected so as to cover a plurality of pixels in the first direction, and the collected electrodes are short-circuited and integrally used. In this manner, the electrodes in a large area are effectively combined. The number of pixel electrodes 15 to be collected, that is, the number of pixels to be covered cannot be categorically determined because the number thereof depends on the size of the pixel and the desired accuracy of coordinate detection. However, in order to obtain an electrode of 0.5 mm to 0.7 mm as described above, in a case where the embedded touch screen 100 includes the liquid crystal panel 13 supporting full-color display, which includes sub-pixels of RGB, it is preferred to collect, in the first direction, three columns or more in sub-pixel unit, and it is more preferred to collect six columns or more.

Figure 12:
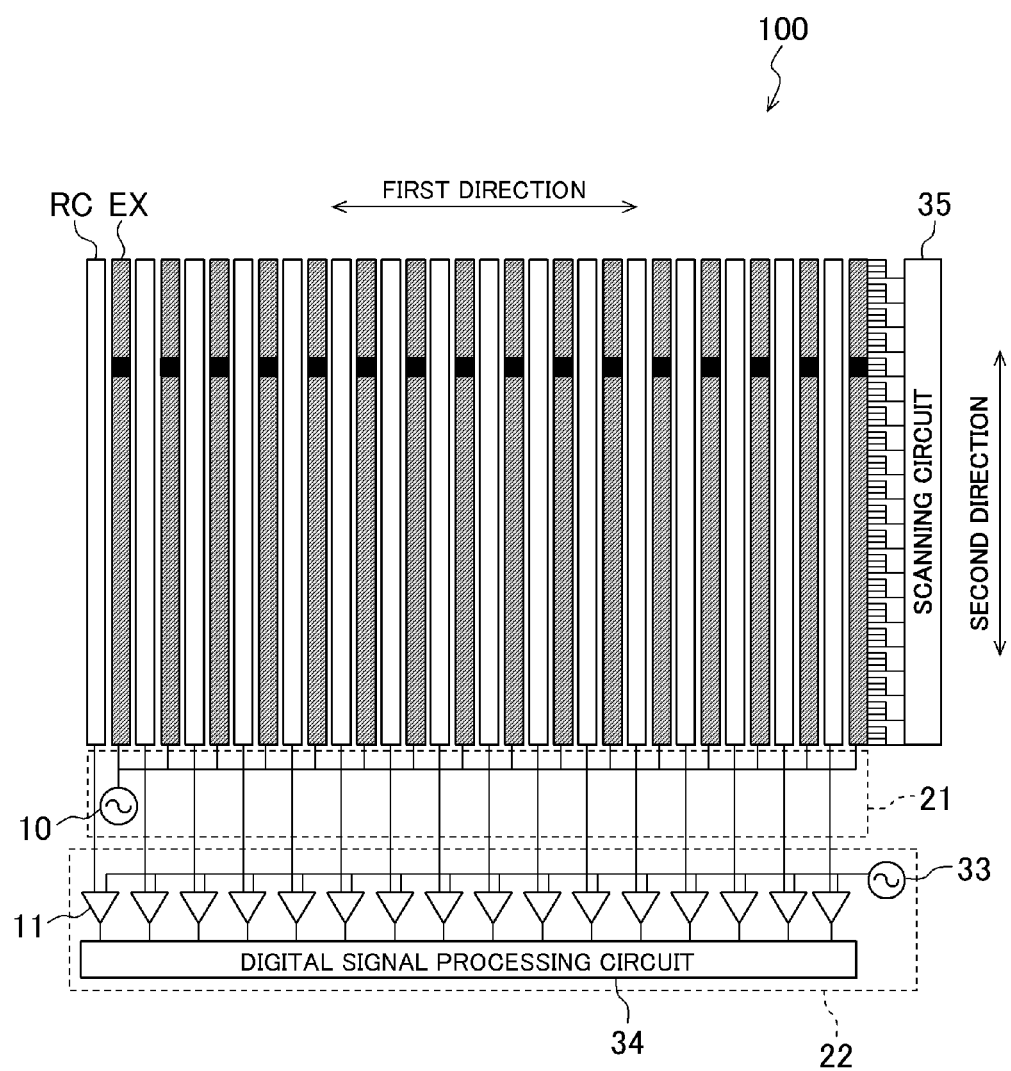
FIG. 12 is a view schematically illustrating an overall configuration when the embedded touch screen according to the first embodiment of this application performs contact detection and coordinate detection.

FIG. 12 is a view schematically illustrating an overall configuration when the embedded touch screen 100 according to this embodiment performs contact detection and coordinate detection. In the image region of the embedded touch screen 100, the application electrodes denoted by reference symbol EX are formed on the second substrate 3, and further, detection electrodes denoted by reference symbol RC are formed on the first substrate 2. In plan view, the application electrodes EX and the detection electrodes RC are alternately arranged in the first direction. Further, each of the application electrode EX and the detection electrode RC has a shape extending long in the second direction that is the arrangement direction. Note that, in order to distinguish those electrodes, the application electrode EX is illustrated with hatching.

In this case, specifically, the application electrode EX is obtained by collecting a plurality of pixel electrodes 15 as described above, but those collected pixel electrodes 15 are here treated as one application electrode EX for convenience. Further, the detection electrode RC is the detecting electrode 37 described above.

The application circuit 21 is connected to the application electrodes EX, and an alternating signal from the alternating power source 10 is applied to each of the application electrodes EX. The detection circuit 22 is connected to the detection electrodes RC. In the detection circuit 22, a signal excited on the detection electrode RC and a signal from a second alternating power source 33 are input to the amplifier 11, and a difference of the signals is amplified to be input to a digital signal processing circuit 34. In this case, the second alternating power source 33 outputs an alternating signal in the same phase as the alternating power source 10, and is adjusted so that the signal excited on the detection electrode RC is cancelled for minimum output under a state in which a finger or the like is not brought into contact with the front surface of the embedded touch screen 100. This configuration is set for increasing the sensitivity and accuracy of contact detection. Note that, when there is no particular problem, the alternating power source 10 may serve as the second alternating power source 33. Further, the digital signal processing circuit 34 outputs coordinates at which the contact is detected as a digital signal based on the amplified signal from the amplifier 11, and may include a low-pass filter, an integration circuit, an A/D conversion circuit, a comparator, and other appropriate circuits for signal processing.

In the configuration described above, the change in signal from one of the plurality of prepared amplifiers 11 is detected to perform, simultaneously to contact detection, coordinate detection in the first direction, that is, contact position detection. However, in this state, coordinate detection in the second direction cannot be performed. Therefore, in this embodiment, a scanning circuit 35 is provided, and the application electrode EX is time-divided in the second direction. In this manner, from the timing at which contact is detected, coordinate detection in the second direction is performed. The scanning circuit 35 is connected to the scanning signal lines 24, and sequentially applies a signal for turning on the TFT 14 to the scanning signal lines 24, to thereby perform scanning in the second direction. In this case, as illustrated in FIG. 12, the scanning by the scanning circuit 35 need not be performed for a unit of each one pixel but a unit of a plurality of pixels. In the example illustrated in FIG. 12, four pixels are collected to be sequentially scanned.

Therefore, at a certain timing, for example, when the alternating signals are output form the alternating power source 10, and further, when a signal for turning on the TFT 14 is applied by the scanning circuit 35 to the scanning signal line 24 at the fifth row from the top in FIG. 12 in the scanning unit, in the application electrodes EX, only the pixel electrodes 15 illustrated as black parts in FIG. 12 are short-circuited to the video signal lines 25, and alternating signals from the alternating power source 10 are input. When there is a change in signal output from any one of the amplifiers 11 at this timing, the contact position in the first direction is determined based on the position of the amplifier 11 at which the change has been detected, and further, the contact position in the second direction is determined based on the position in the scanning unit at a time point when the output signal has changed (fifth row from the top in FIG. 12). As a result, coordinate detection is performed. Note that, the scanning circuit 35 may be separately provided from the scanning signal line drive circuit 19 (see FIG. 3), or the scanning circuit 35 may serve as the scanning signal line drive circuit 19.

Note that, the "scanning" as used herein refers to an operation of sequentially selecting only one target once at a time with respect to all targets continuously arranged, and the selection may be performed in any order. Generally, the "scanning" often refers to an operation of sequentially selecting one of all targets continuously arranged in order from the end so that the control or circuit becomes simple. A similar operation is employed also in this embodiment, but this application is not limited thereto.

Figure 13:
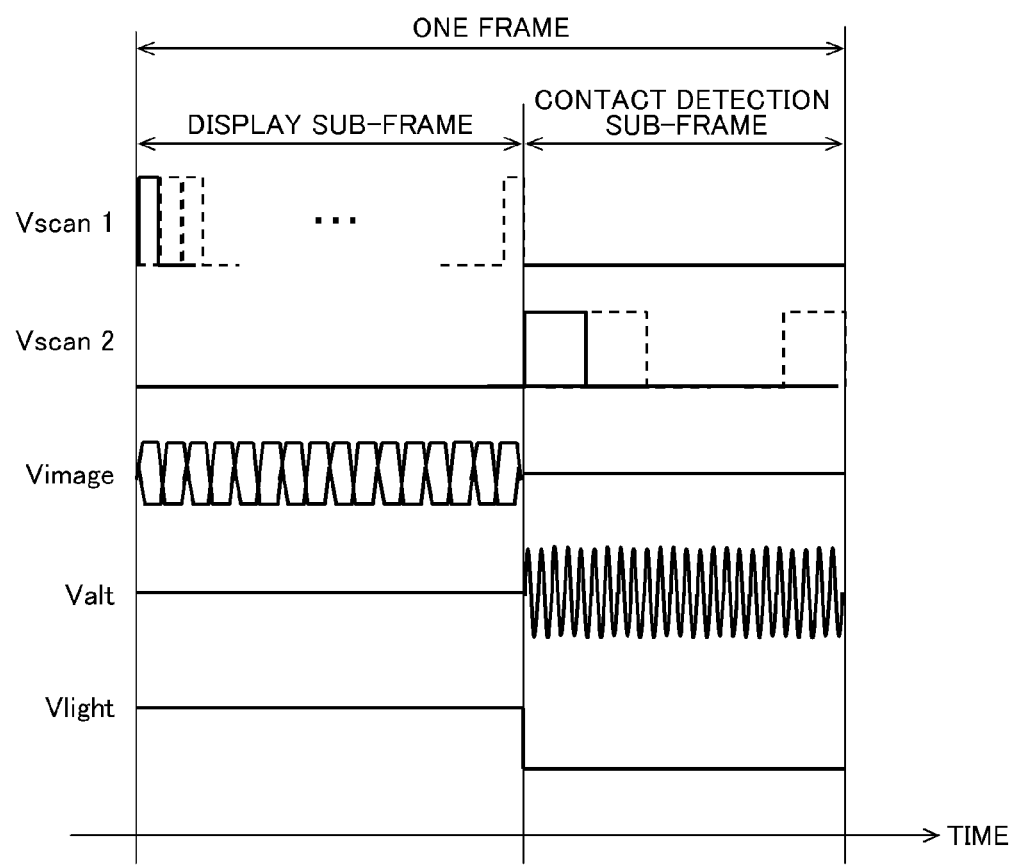
FIG. 13 is a diagram illustrating waveforms of operation signals of the embedded touch screen according to the first embodiment of this application.

FIG. 13 is a diagram illustrating waveforms of operation signals of the embedded touch screen 100 according to this embodiment. The embedded touch screen 100 sequentially updates an image to be displayed. A period from when one image is displayed to when the next image is displayed is called a frame. Further, in the embedded touch screen 100, the frame is further divided into a display sub-frame and a contact detection sub-frame. The length of one frame depends on the frame frequency. For example, the length thereof is 16.7 ms when the frame frequency is 60 Hz. How to determine the length of the sub-frames is arbitrary. For example, the display sub-frame is set to 12 ms and the contact detection sub-frame is set to 4.7 ms.

The display sub-frame is a period in which the embedded touch screen 100 displays an image, and is also a writing period in which the video display circuit 23 writes a video signal. In the display sub-frame, a scanning signal line drive signal Vscan1 that is a pulse signal for each one row of pixels is sequentially input from the scanning signal line drive circuit 19 (see FIG. 3), and a video signal Vimage is written into the pixel electrode 15. Further, a backlight drive signal Vlight is in an on state, and thus the backlight unit 5 is turned on. At this time, a contact detection scanning signal Vscan2 from the scanning circuit 35 and an alternating signal Valt from the application circuit 21 are not supplied.

Note that, it is unimportant to describe the detailed operation of the embedded touch screen 100 as the liquid crystal display device for describing this application, and hence the waveforms of the operation signals in the above-mentioned display sub-frame are simplified. Description is made above as if the video signal Vimage is written and the backlight unit 5 is turned on during the entire period of the display sub-frame. However, for realizing the embedded touch screen 100, the period for writing the video signal Vimage may be a part of the period of the display sub-frame, and further, the backlight unit 5 may be entirely or partially turned off in a period in which the video signal Vimage is written.

The contact detection sub-frame is a period in which the embedded touch screen 100 performs contact detection and coordinate detection, and is also a detection period in which application by the application circuit 21 and detection by the detection circuit 22 are performed. In the contact detection sub-frame, supply of the scanning signal line drive signal Vscan1 and the video signal Vimage is stopped, and the alternating signal Valt is supplied to the application electrode EX. By stopping the supply of the scanning signal line drive signal Vscan1 and the video signal Vimage during the contact detection sub-frame, it is possible to prevent electromagnetic noises from those signals from affecting contact detection and coordinate detection.

As described above, the alternating signal Valt is desired to have a frequency at which the liquid crystal does not respond, and the frequency is set to 1 kHz or larger, more preferably 10 kHz or larger. On the other hand, in this embodiment, the signal is detected via the TFT 14, and hence the excitation frequency is required to be sufficiently smaller than the cutoff frequency of the TFT 14. The cutoff frequency depends on the type and size of the TFT to be used, and the upper limit of the frequency of Valt differs depending on the design, but in a case of a MOS type TFT generally used at present time, it is preferred that the upper limit of the frequency of Valt be about 100 kHz or smaller in a case of an amorphous silicon TFT that is widely used in a large-sized television set, and about 10 MHz or smaller in a case of a polysilicon TFT that is used in a small-sized display used in mobile devices and the like.

Further, the contact detection scanning signal Vscan2 that is a pulse signal for each scanning unit is sequentially input, and thus the entire embedded touch screen 100 is scanned in the second direction. Further, at this time, the backlight drive signal Vlight is set in an off state so that the backlight unit 5 is turned off.

The reason is as follows. When the contact detection scanning signal Vscan2 is input, the pixel electrodes 15 included in the scanning unit are short-circuited, and hence the image to be displayed on the embedded touch screen 100 is disturbed. By turning off the backlight unit 5, it is possible to prevent deterioration of image caused by the short-circuit. Note that, instead of turning off the backlight unit 5, a voltage for black display can be written into the pixel electrode 15 so that a signal for black display is held in the pixel electrode 15.

Alternatively, in the contact detection sub-frame, the pixel electrode 15 may hold the video signal Vimage and the alternating signal Valt may be superimposed to the pixel electrode 15 so that the display of the image is maintained in the contact detection sub-frame as well. In this case, a little ingenuity is required in the circuit, but, in FIG. 12, it is preferred that the application circuit 21 and the individual pixel electrodes 15 included in the application electrode EX be connected to each other via a high-pass filter. It is preferred to set the cutoff frequency of the high-pass filter so as to have a value that allows passage of the alternating signal Valt but prevents passage of the video signal Vimage. In this case, the backlight unit 5 is not always required to be turned off in the contact detection sub-frame.

By the way, it is described above that the detection electrode RC, that is, the detecting electrode 37 is formed on any one of the front surface and the rear surface of the first substrate 2. This point is described in detail for each configuration with reference to FIG. 1.

First, as illustrated in FIG. 1, when the detecting electrode 37, that is, the electrode 8 in FIG. 1 is formed on the front surface of the first substrate 2, the alternating electric field formed between the electrode 7 and the electrode 8 does not pass through the first substrate 2 in front of the electrode 8, and is likely to protrude from the first substrate 2 on the front surface side. Therefore, there is an advantage that good contact detection sensitivity can be achieved. On the other hand, the electrode 8 and the insulating layer 6 are required to be formed on the front surface and the rear surface of the first substrate, respectively, and hence the manufacturing process is somewhat complicated.

In contrast, when the electrode 8 is formed on the rear surface of the first substrate 2, the alternating electric field formed between the electrode 7 and the electrode 8 is required to pass through the first substrate 2 for both of the electrode 7 and the electrode 8, but the electrode 8 and the insulating layer 6 are both formed on the surface of the first substrate 2 on the same side, and hence the manufacture is easy. Further, with such a structure, the front surface of the first substrate 2 can be polished after the first substrate 2 and the second substrate 3 are bonded to each other. With this, the thickness of the first substrate can be reduced, to thereby reduce the thickness and weight of the entire embedded touch screen 1. Note that, the method of polishing the first substrate 2 is not particularly limited, but so-called chemical polishing using hydrofluoric acid may be employed. Further, in the embedded touch screen 1 obtained through such a step, the front surface of the first substrate 2 is a polished surface. Note that, when the electrode 8 is formed on the rear surface of the first substrate 2, the electrode 8 may be overlapped with a so-called black matrix formed on the first substrate 2 in plan view. In this case, the electrode 8 may not necessarily be formed of a transparent conductive film such as ITO. Even when the electrode 8 is formed of a transparent conductive film, the electrode 8 may be prevented from being visually recognized by an observer depending on conditions such as light beam reflection.

Various modifications can be made to the embodiment described above. In the following, such modified embodiments of this application are described.

Figure 14:
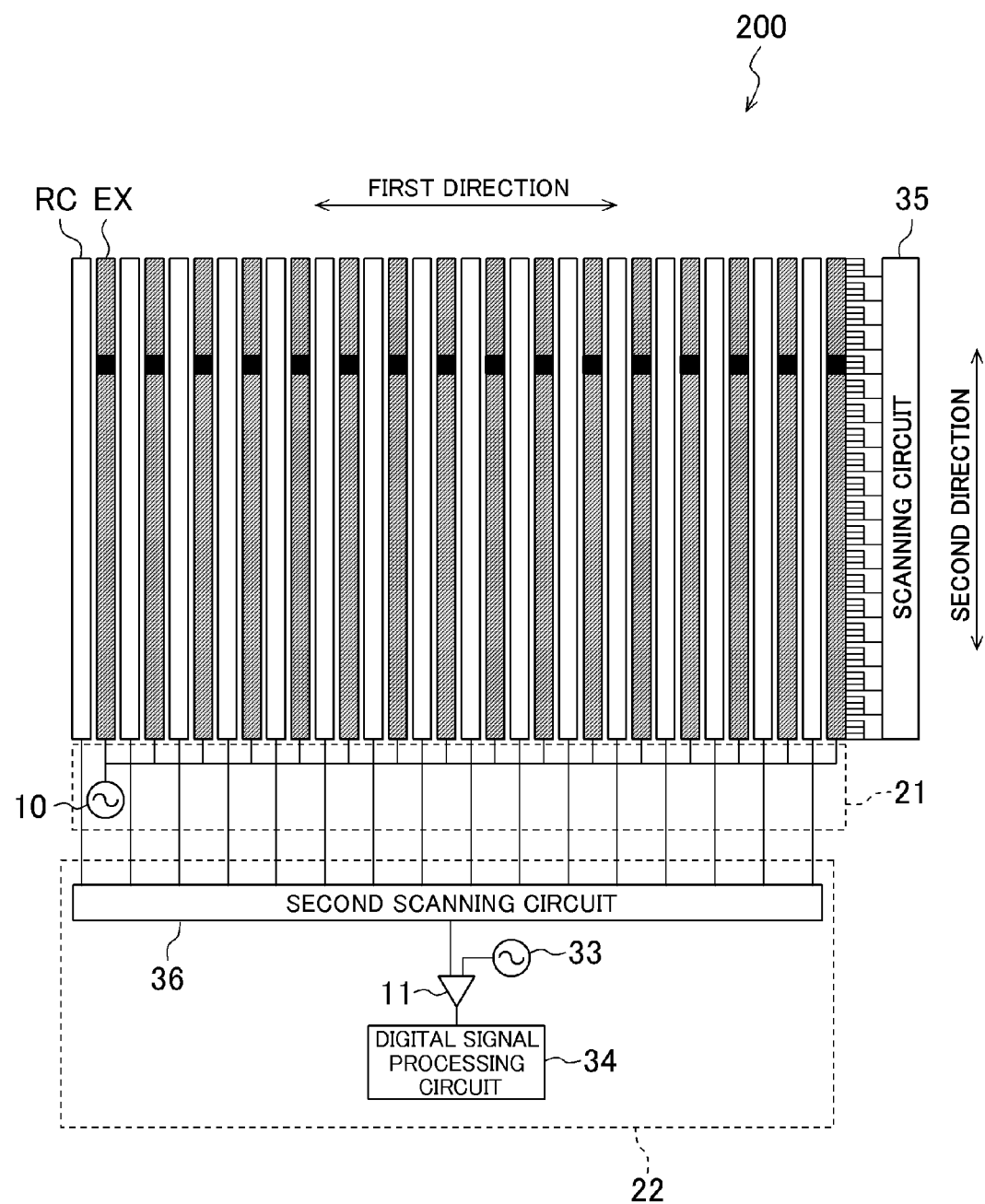
FIG. 14 is a view schematically illustrating an overall configuration when an embedded touch screen according to a second embodiment of this application performs contact detection and coordinate detection.

FIG. 14 is a view schematically illustrating an overall configuration when an embedded touch screen 200 according to a second embodiment of this application performs contact detection and coordinate detection. Note that, detailed structures of the embedded touch screen 200 other than those illustrated in FIG. 14 are similar to those in the embedded touch screen 100 according to the first embodiment described above, and hence redundant description thereof is omitted.

In the embedded touch screen 200, the arrangement and configuration of the application electrode EX and the application circuit 21 are the same as those in the first embodiment. The configuration of the detection circuit 22 connected to the detection electrode RC is different from that in the first embodiment, and the amplifier 11 is connected to the respective detection electrodes RC via a second scanning circuit 36. Further, the number of the amplifiers 11 is only one in this embodiment, and is smaller than the number of the detection electrodes RC.

In this embodiment, the detection electrode RC is time-divided also in the first direction. Thus, from the timing at which the contact detection is performed, coordinate detection is performed not only in the second direction but also in the first direction. That is, the second scanning circuit 36 sequentially connects the amplifier 11 and the detection electrodes RC to scan the detection electrodes RC in the first direction. During the scanning performed by the second scanning circuit 36, one of the plurality of detection electrodes RC is connected to the amplifier 11.

Further, simultaneously, the scanning circuit 35 performs scanning in the second direction. The order of the scanning performed by the second scanning circuit 36 in the first direction and the scanning performed by the scanning circuit 35 in the second direction is not limited, but in this embodiment, under a state in which a specific scanning unit is selected by the scanning circuit 35 in the second direction, a sequence of scanning is performed by the second scanning circuit 36 in the first direction. Then, the scanning circuit 35 selects a new scanning unit, and a sequence of scanning is performed by the second scanning circuit 36 in the first direction again. This operation is repeated to scan the entire image region. In this manner, based on the timing at which the change of the signal from the amplifier 11 has been detected, contact positions both in the first direction and the second direction are detected, thereby performing contact detection and coordinate detection.

In this configuration, the scanning in the first direction is repeated, and hence as compared to the first embodiment, the time taken for contact detection and coordinate detection becomes longer. However, in this embodiment, the amplifier 11 is provided in a small number of merely one, and further, the number of signal lines is also small. Thus, the circuit scale of the digital signal processing circuit 34 is reduced, and the detection circuit 22 becomes simple and compact.

Note that, also in FIG. 14, the application electrode EX is illustrated with hatching, and further, the scanning unit in which the TFT 14 is turned on by the scanning circuit 35 (as an example, the fifth scanning unit from the top) is illustrated as black parts.

Figure 15:
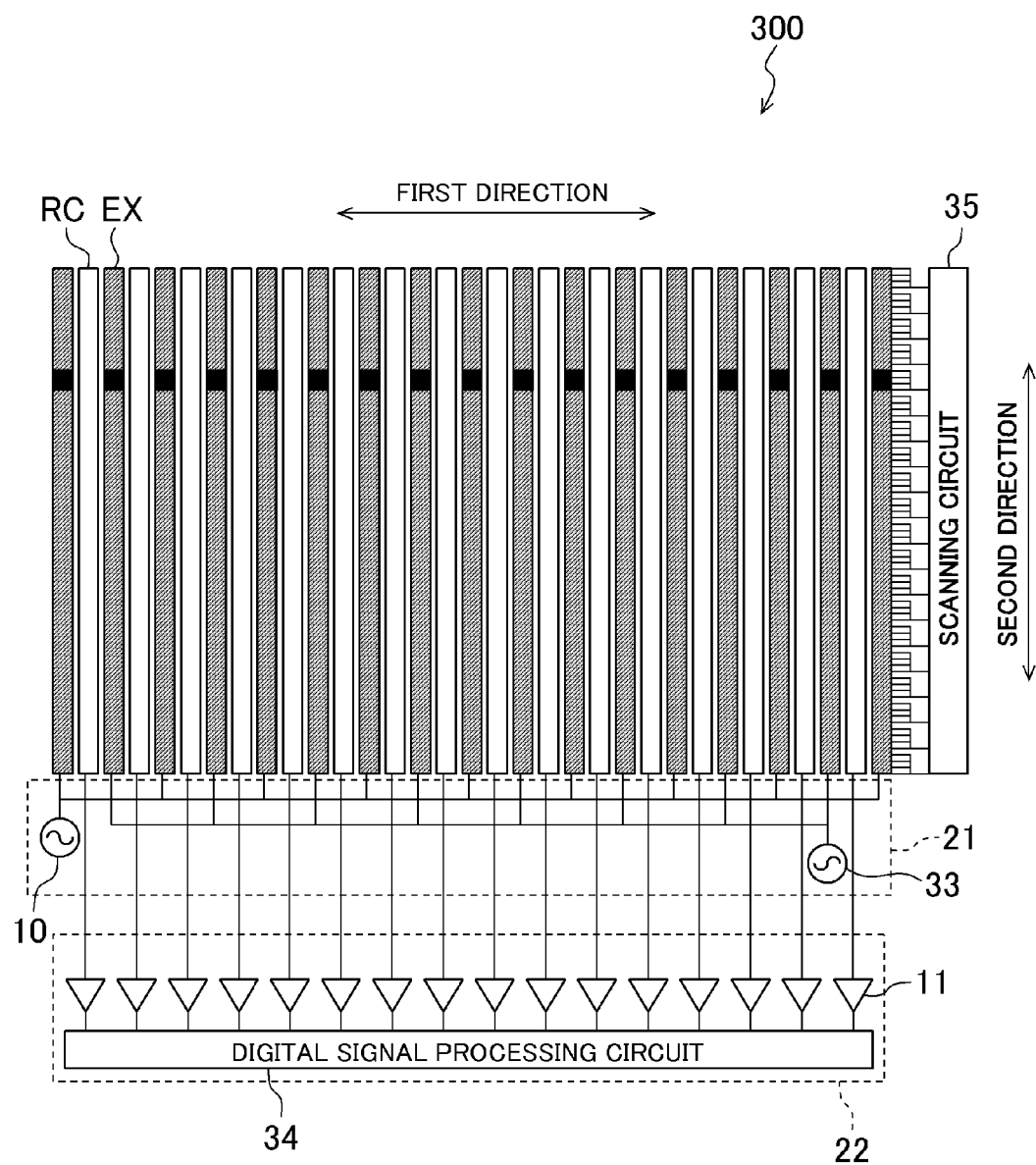
FIG. 15 is a view schematically illustrating an overall configuration when an embedded touch screen according to a third embodiment of this application performs contact detection and coordinate detection.

FIG. 15 is a view schematically illustrating an overall configuration when an embedded touch screen 300 according to a third embodiment of this application performs contact detection and coordinate detection. Note that, detailed structures of the embedded touch screen 300 other than those illustrated in FIG. 15 are also similar to those in the embedded touch screen 100 according to the first embodiment described above, and hence redundant description thereof is omitted.

In the embedded touch screen 300, the arrangement and configuration of the application electrode EX and the detection electrode RC are the same as those in the first embodiment.

The application circuit 21 includes, in addition to the alternating power source 10, a second alternating power source 33, and the alternating signal from the alternating power source 10 is applied to the alternate application electrodes EX in the first direction. An alternating signal from the second alternating power source 33 is applied to the remaining application electrodes EX. That is, when focusing on only the application electrodes EX, along the first direction, the alternating signal from the alternating power source 10 and the alternating signal from the second alternating power source 33 are alternately applied.

In this case, the alternating signal output from the second alternating power source 33 is a signal having a phase that is reversed by 180° with respect to the alternating signal output from the alternating power source 10. Therefore, when focusing on one of the detection electrodes RC, the alternating signal output from the alternating power source 10 is applied to one of the application electrodes EX adjacent to the corresponding detection electrode RC, while the alternating signal having a phase that is reversed by 180° with respect thereto is output from the second alternating power source 33 to be applied to the other of the application electrodes EX, which is located on the opposite side.

With this configuration, under a state in which nothing is brought into contact with the surface of the embedded touch screen 300, an alternating electric field excited by the alternating signal output from the alternating power source 10 and an alternating electric field excited by the alternating signal having a phase that is reversed by 180° with respect thereto act on the detection electrodes RC. Thus, both of the alternating electric fields are balanced to be cancelled, and hence almost no signal is detected. In contrast, when a finger or the like is brought into contact with the surface of the embedded touch screen 300, this balance is disturbed, and thus the detection electrode RC detects a signal. Even with such a configuration, the sensitivity and accuracy of contact detection can be enhanced.

Note that, FIG. 15 illustrates the second alternating power source 33 as if the second alternating power source 33 is formed separately from the alternating power source 10, but this application is not always limited thereto. That is, a part of the alternating power source 10 may be used as the second alternating power source 33, or a part of the second alternating power source 33 may be used as the alternating power source 10. For example, a phase reversing circuit may be connected to the alternating power source 10, to thereby obtain the alternating signal having a phase that is reversed by 180° with respect to the alternating signal from the alternating power source 10. In this case, the second alternating power source 33 includes the alternating power source 10 and the phase reversing circuit. Further, also in FIG. 15, the application electrode EX is illustrated with hatching, and further, the scanning unit in which the TFT 14 is turned on by the scanning circuit 35 (as an example, the fifth scanning unit from the top) is illustrated as black parts. Further, the configuration in which the alternating signal having a phase that is reversed by 180° with respect to the alternating signal applied to one of the application electrodes EX adjacent to the detection electrode RC is applied to the other of the application electrodes EX adjacent to the detection electrode RC as in this embodiment may be applied not only to the third embodiment but also to the first and second embodiments that have already been described.

Note that, in the first to third embodiments described above, the application electrode EX and the detection electrode RC may be replaced with each other. That is, the pixel electrode 15 may be used as the detection electrode RC, and the detecting electrode 37 may be used as the application electrode EX.

According to the aspect of Item (1) of this application, it is possible to provide the embedded touch screen that is unlimited by the shape of the common electrode and the signal for contact detection.

According to the aspect of Item (2) of this application, it is possible to perform scanning in the second direction without requiring new wiring space for scanning by using the existing scanning signal line.

According to the aspect of Item (3) of this application, the manufacture is facilitated because only one surface of the first substrate is required to be subjected to processes such as lithography.

According to the aspect of Item (4) of this application, it is possible to polish the front surface of the first substrate after the first substrate and the second substrate are bonded to each other, and hence the embedded touch screen reduced in thickness and weight can be obtained.

According to the aspect of Item (5) of this application, the embedded touch screen with good contact detection sensitivity can be obtained.

While there have been described what are at present considered to be certain embodiments of the invention, it will be understood that various modifications may be made thereto, and it is intended that the appended claims cover all such modifications as fall within the true spirit and scope of the invention.

What is claimed is:

1. An embedded touch screen, comprising:
   a plurality of scanning signal lines extending in a first direction;
   a plurality of video signal lines extending in a second direction that is different from the first direction;
   a first substrate comprising, on one of a front surface and a rear surface thereof, a plurality of detecting electrodes extending in the second direction;
   a second substrate having an image region in which a plurality of pixels are arranged, the plurality of pixels being sectioned by the plurality of scanning signal lines and the plurality of video signal lines in matrix,
   the second substrate comprising, on a front surface thereof:
      a plurality of pixel electrodes connected to a corresponding one of the plurality of video signal lines via a switching element connected to a corresponding one of the plurality of scanning signal lines in each of the plurality of pixels; and
      a common electrode;
   a liquid crystal layer sandwiched between the first substrate and the second substrate;
   a video signal line drive circuit connected to one end of each of the plurality of video signal lines in order to apply voltages corresponding to video signals to the plurality of pixel electrodes respectively during a display sub-frame;
   an application circuit connected to another end of each of the plurality of video signal lines in order to apply an alternating signal to the plurality of pixel electrodes during a contact detection sub-frame which is different from the display sub-frame;
   a detection circuit for detecting a signal excited on a corresponding one of the plurality of detecting electrodes during the contact detection sub-frame; and
   a scanning circuit for scanning the pixel electrode at least in the second direction during the contact detection sub-frame.

2. The embedded touch screen according to claim 1, wherein the scanning circuit outputs a scanning signal to corresponding one of the plurality of scanning signal lines.

3. The embedded touch screen according to claim 1, wherein the plurality of detecting electrodes are formed on the rear surface of the first substrate.

4. The embedded touch screen according to claim 3, wherein the front surface of the first substrate comprises a polished surface.

5. The embedded touch screen according to claim 1, wherein the plurality of detecting electrodes are formed on the front surface of the first substrate.

6. The embedded touch screen according to claim 1, wherein the detection circuit includes at least one amplifier connected to a corresponding one of the plurality of detecting electrodes.

7. The embedded touch screen according to claim 1, wherein a frequency of the alternating signal is equal to or larger than 1 kHz.

8. The embedded touch screen according to claim 1, wherein the application circuit and the plurality of video signal lines are connected to each other via a high-pass filter.

9. The embedded touch screen according to claim 1, wherein the application circuit includes an alternating power source which divides the plurality of video signal lines into a plurality of groups, each of the plurality of video signal lines in a corresponding group of the plurality of groups being short-circuited to each other via the alternating power source, the alternating power source applying the alternating signal to the plurality of groups.

* * * * *